United States Patent
Ohmura

[19]

[11] Patent Number: 6,067,742
[45] Date of Patent: *May 30, 2000

[54] LINE GUIDE FOR FISHING ROD

[75] Inventor: Ryuichi Ohmura, Shizuoka, Japan

[73] Assignee: Fuji Kogyo Co., Ltd., Shizuoka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,547

[22] Filed: Feb. 24, 1997

[30] Foreign Application Priority Data

Feb. 28, 1996 [JP] Japan .................................. 8-082974

[51] Int. Cl.⁷ .................................................. A01K 87/04
[52] U.S. Cl. ................................................................ 43/24
[58] Field of Search ................................ 43/24; D22/143

[56] References Cited

U.S. PATENT DOCUMENTS

| | | | |
|---|---|---|---|
| D. 256,714 | 9/1980 | Ohmura | D22/143 |
| 263,484 | 8/1882 | Chubb . | |
| D. 270,268 | 8/1983 | Ohmura | D22/143 |
| D. 280,656 | 9/1985 | Ohmura | D22/143 |
| D. 298,645 | 11/1988 | Miyata et al. | D22/143 |
| 338,212 | 3/1886 | Whiting . | |
| D. 340,499 | 10/1993 | Ohmura | D22/143 |
| D. 340,500 | 10/1993 | Ohmura | D22/143 |
| D. 349,749 | 8/1994 | Yamamoto et al. | D22/143 |
| D. 393,044 | 3/1998 | Ohmura | D22/143 |
| D. 395,695 | 6/1998 | Ohmura | D22/143 |
| D. 409,713 | 5/1999 | Ohmura | D22/143 |
| D. 410,725 | 6/1999 | Ohmura | D22/143 |
| 868,563 | 10/1907 | Holzmann | 43/24 |
| 1,444,063 | 2/1923 | Davis . | |
| 1,781,569 | 11/1930 | Cook . | |
| 1,937,972 | 12/1933 | Madden . | |
| 2,502,846 | 4/1950 | Hoffman | 43/24 |
| 2,718,085 | 9/1955 | Bean . | |
| 3,171,228 | 3/1965 | Cwik . | |
| 4,176,488 | 12/1979 | Ohmura | 43/24 |
| 4,186,508 | 2/1980 | Howald | 43/24 |
| 4,215,504 | 8/1980 | Ohmura | 43/24 |
| 4,467,549 | 8/1984 | Dequet | 43/24 |
| 4,507,891 | 4/1985 | Ohmura | 43/24 |
| 4,888,906 | 12/1989 | Yamato | 43/24 |
| 5,177,892 | 1/1993 | Ohmura | 43/24 |
| 5,802,759 | 9/1998 | Ohmura | 43/24 |
| 5,901,492 | 5/1999 | Ohmura | 43/24 |
| 5,941,013 | 8/1999 | Ohmura | 43/24 |

FOREIGN PATENT DOCUMENTS 404088938  3/1992  Japan ........................................ 43/24

*Primary Examiner*—Michael J. Carone
*Assistant Examiner*—Darren W. Ark
*Attorney, Agent, or Firm*—Evenson, McKeown, Edwards & Lenahan, PLLC

[57] ABSTRACT

A line guide ring enhancing casting controllability of a fishing rod wherein the dimension between the inner circumferential surface of an annular holder frame for holding a guide ring and the bottom surface of the mounting leg being kept at a minimum and substantially the same as the plate thickness of a metal plate; the annular holder frame 3 for holding the guide ring 7 through which the fishing line being caused to pass and the mounting leg 4 for mounting the holder frame 3 onto the fishing rod being integrally formed from a single metal plate; the part on the outer circumferential side of the holder frame 3 being bent from a position close to its inner circumferential surface 5 in the axial direction so that the holder frame 3 may be formed into a shallow concave shape; the outer circumferential surface being formed into a rear surface 6 facing substantially in the same direction as the axial direction, and the mounting leg 4 extending from the rear surface 6.

11 Claims, 3 Drawing Sheets

LINE GUIDE FOR FISHING ROD

BACKGROUND OF THE INVENTION

The present invention relates to a line guide for a fishing rod. More specifically, it relates to a line ring for a fishing rod in which a holder frame having an annular shape for holding the guide ring through which the fishing line is caused to pass and a mounting leg for mounting the holder frame on the fishing rod are formed integrally by a single piece of metal sheet. In particular, the number of the mounting legs is single.

Today, many line guides which are mounted on outer surfaces of fishing rods are of a type in which a guide ring made of ceramics or the like is mounted on a frame made of metal.

FIG. 5 shows an example of a conventional line guide ring having such a structure. Reference character b denotes a frame which is integrally formed of a holder frame c and a mounting leg d which are made of a single metal plate. The holder frame c is in the form of a ring, and is located to extend from an outer circumferential edge e of the holder frame c in a direction in parallel to the axis thereof. Reference character f denotes a guide ring which is internally fitted in the holder frame c.

The above-described mounting leg d is mounted on the fishing rod. In general, the mounting is carried by winding a thread around the fishing rod together with the mounting leg d under the condition that the mounting leg d is seated on the outer circumferential surface of the fishing rod.

There are many components for affecting the performance of the fishing rod. Among them, the line guide ring is one of the important components which have something to do with various factors such as weight and action performance of the fishing rod, distance of a fishing device, casting controllability for positioning the fishing device at the point in the water and the like.

In order to enhance the casting controllability in particular, it is necessary to reduce as much as possible "twist" of the rod in casting the fishing device. To meet this requirement, it is necessary to maintain the fishing line as close as possible to the fishing rod at least along the rod tip or at the position close to the rod tip, to thereby reduce the twist moment, if any.

In order to achieve this, it is necessary to shorten as much as possible the distance between the inner circumferential surface of the guide ring of the line guide ring and the fishing rod. For the frame b, the distance is represented by a dimension H from the inner circumferential surface of the holder c to the bottom surface of the mounting leg d.

However, in the above-described conventional line guide ring a, it was practically impossible to decrease the above-described dimension H down to the level which is equal to or less than 2t (where t is the thickness of the metal plate which forms the frame b). More specifically, the thickness of the mounting leg d is defined by the plate thickness t, itself, of the metal plate selected as the material. In view of the machining aspect, the minimum plate thickness t is required for the width w of the holder frame c. Namely, in view of the necessity that the holder c has to hold the guide ring f, it is necessary to form the holder frame in a perfect circle ring shape. Also, in order to bend the mounting leg d relative to the holder frame c, it is necessary to provide a "bending allowance" to some extent. After all, the above-described dimension H should be about twice larger than the thickness t of the metal plate.

For this reason, the fishing rod having the conventional line guide ring a suffers from a problem that it is difficult to enhance the casting controllability.

SUMMARY OF THE INVENTION

An object of the present invention is to overcome the above-noted defects and to provide a novel line guide ring for a fishing rod which contributes to the enhancement of the casting controllability of the fishing rod.

According to the invention, there is provided a line guide ring for a fishing rod in which a holder frame having an annular shape for holding a guide ring through which the fishing line is caused to pass and a mounting leg for mounting the holder frame onto the fishing rod are made integrally from a metal plate, said line guide ring being characterized in that said holder frame is bent from an inner circumferential surface thereof in a direction including a component in an axial direction to be formed in a shallow concave shape and said mounting leg extends from a peripheral surface facing in the rear direction of said holder frame.

DESCRIPTION OF THE PREFERRED EMBODIMENTS

A line guide ring for a fishing rod according to various embodiments of the present invention will now be described in detail with reference to the accompanying drawings.

Figure 1:
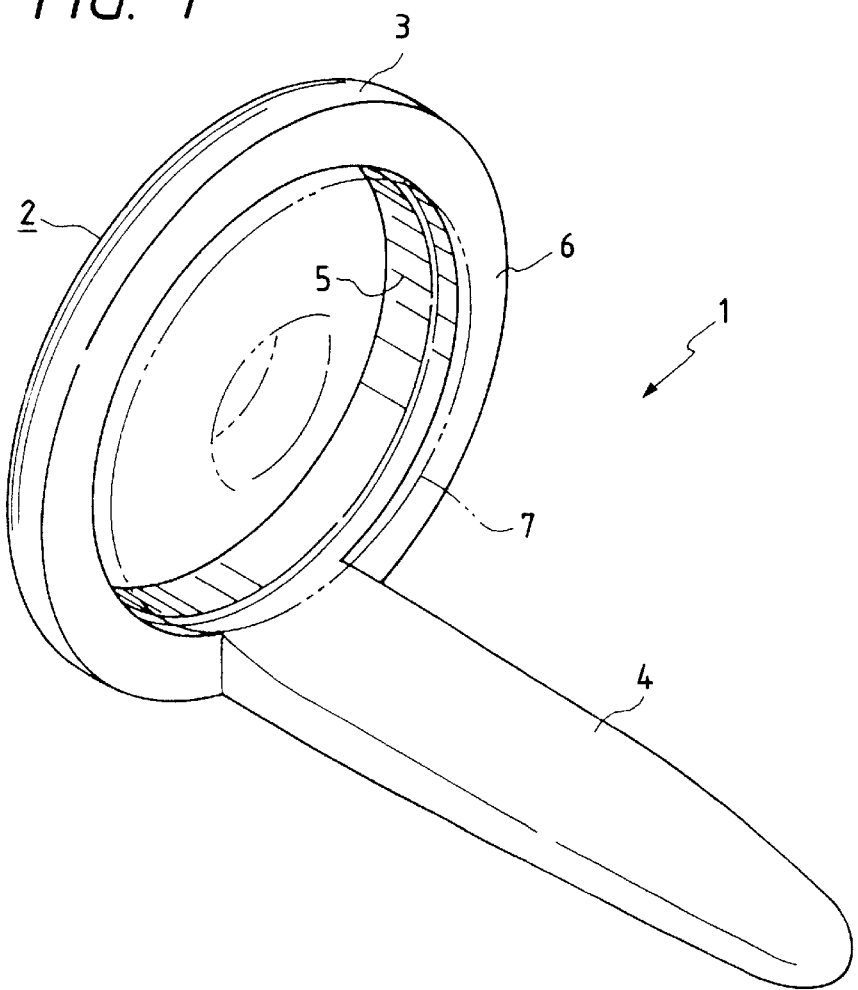
FIG. 1 is an enlarged perspective view showing a line guide ring for a fishing rod according to a first embodiment of the invention.
Figure 2:
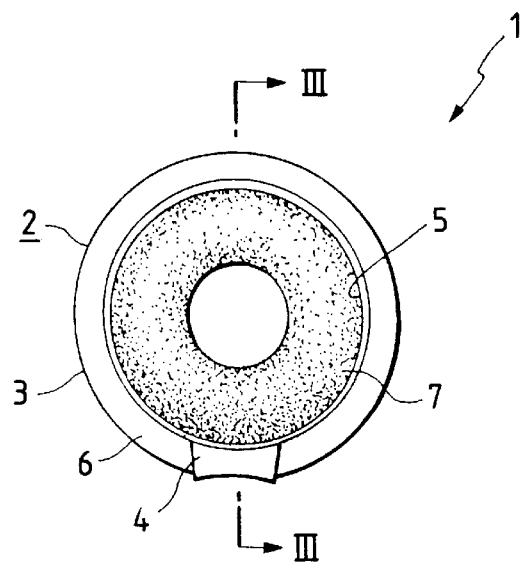
FIG. 2 is a rear view showing the line guide ring shown in FIG. 1.
Figure 3:
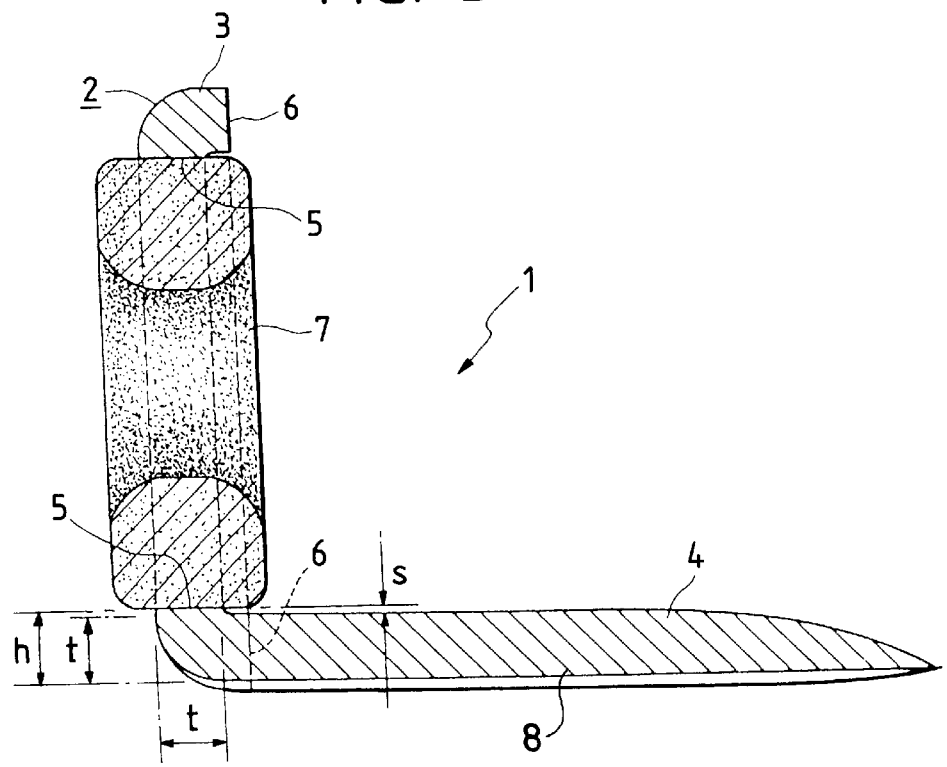
FIG. 3 is an enlarged cross-sectional view taken along the line III—III of FIG. 2.

FIGS. 1 to 3 shows a first embodiment of the line guide ring for a fishing rod according to the present invention.

Reference numeral 2 denotes a frame made of metal. The frame 2 is formed into a one-piece member of a holder frame 3 and a mounting leg 4 by press-working a metal plate having a predetermined plate thickness, the metal plate being made of, for example, stainless steel, aluminum or the like. The holder frame 3 is in the form of a ring and the mounting leg 4 is in the form of a narrow tongue.

The holder frame 3 is basically formed into a circular strip member having a width that is somewhat larger than the plate thickness of a material. The holder frame 3 is formed into a shallow concave shape by bending an outer portion on the circumferential side in the axial direction from a position close to an inner circumferential surface 5 of the circular strip member. Accordingly, the outer peripheral surface of the basic circular strip member is made into a rear surface 6 facing in a direction in parallel to the axial direction.

Then, the mounting leg 4 is located to extend in a direction substantially in parallel to the axial direction from the rear surface 6 of the holder frame 3.

Accordingly, the width of the holder frame 3 as viewed in the axial direction is the dimension h which is obtained by adding the small bending allowance s to the plate thickness t of the metal plate which is the basic material. The thickness of the mounting leg 4 is included in the above-described dimension h in a general shape in which the mounting leg 4 is not bent in the plate thickness direction.

Thus, the dimension from the inner circumferential surface 5 to the bottom surface 8 of the mounting leg 4 may be kept at minimum and may be the dimension h which is obtained by adding the "bending allowance" s to the plate thickness of the material.

Reference numeral 7 denotes a guide ring which is internally fitted in the holder frame 3. This fitting is performed by press-fitting or adhesion.

The mounting operation of the line guide ring 1 to a fishing rod is carried out in the conventional method. Namely, the mounting operation is carried out by winding a thread around the fishing rod together with the mounting leg 4 under the condition that the mounting leg 4 is seated on the outer circumferential surface of the fishing rod.

Figure 4:
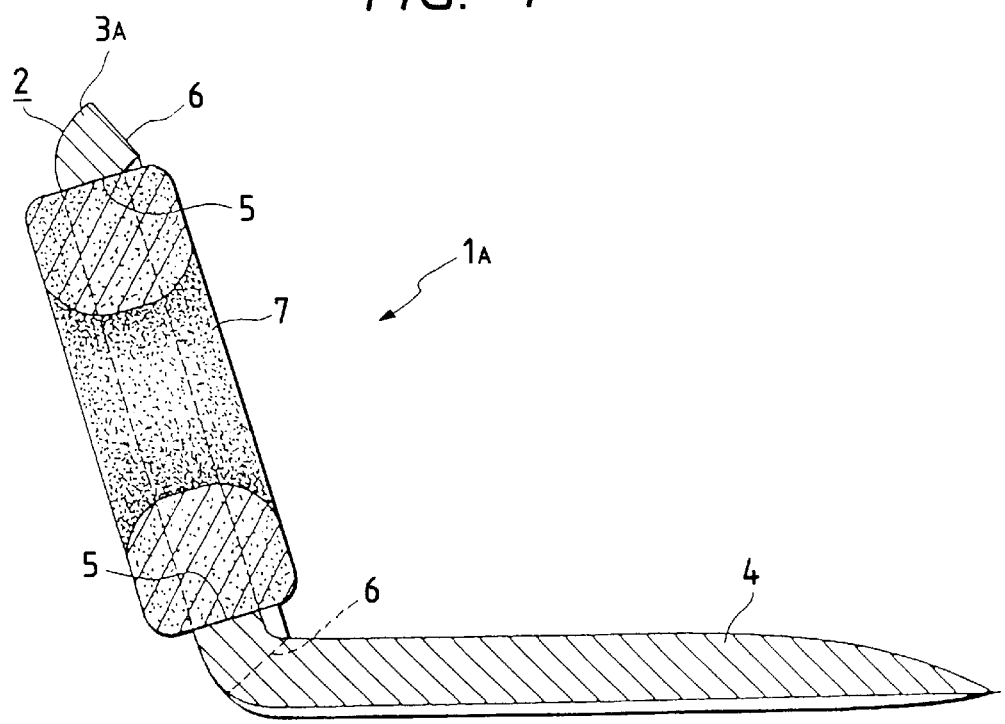
FIG. 4 is a vertical sectional view showing a line guide ring for a fishing rod according to a second embodiment of the invention.
Figure 5:
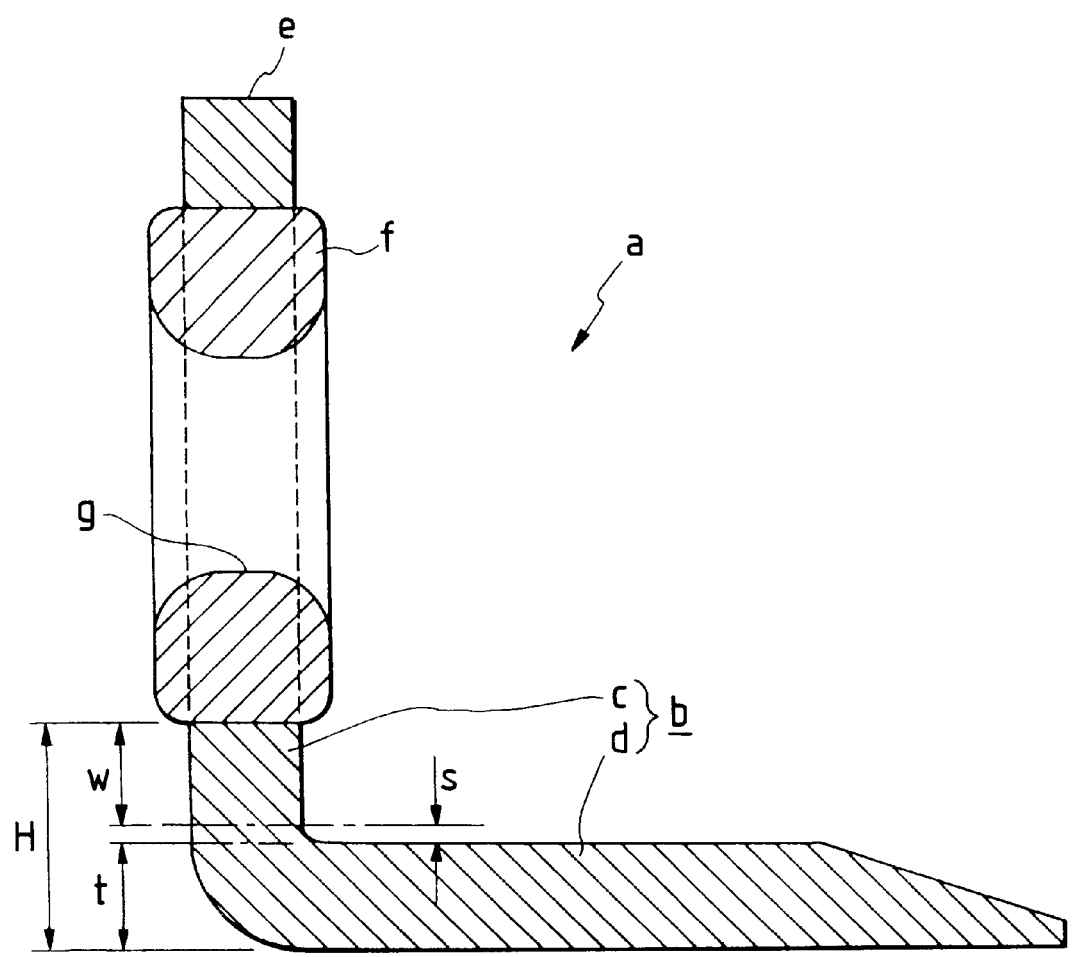
FIG. 5 is a vertical sectional view showing a conventional guide ring for a fishing rod.

FIG. 4 shows a second embodiment of a line guide ring for a fishing rod according to the present invention.

The difference between the line guide ring 1A according to the second embodiment and that of the first embodiment lies only in the angle of the holder frame to the mounting leg. Accordingly, the explanation of the structure as to the components and parts which are the same as those in FIGS. 1 to 3 may be omitted by imparting the same reference numerals to those components and parts.

Reference character 3A denotes a holder frame. The holder frame 3A is formed in a shallow concave shape with a certain angle relative to the axial direction. Namely, it is formed into a shape in which a longitudinal sectional shape is trapezoidal. As a result, a certain slant angle (i.e., about 15° in FIG. 4) is provided in a forward direction relative to a vertical posture to the mounting leg 4.

When the holder frame 3A is thus slanted, even if the fishing line is entangled with the holder frame 3A, it is possible to automatically cancel the entanglement since the fishing line is slid on the slant surface of the holder frame 3A when a tension is applied to the fishing line.

Also, when the holder frame 3A is thus slanted, it is possible to shorten, further closer to the thickness of the frame 2, the dimension h from the inner circumferential surface 5 of the holder frame 3A to the bottom surface 8 of the mounting leg 4. Thus, to this extent, it is possible to enhance the casting controllability of the fishing rod.

As has been apparent from the above, in the line guide ring for a fishing rod according to the present invention, the holder frame having a circular shape for holding the guide ring is bent from a position close to the inner circumferential surface thereof in a direction including a component in the axial direction. As a result, it is possible to direct the peripheral surface thereof substantially in a direction which is substantially the same as the above-described direction. The mounting leg extends from the outer circumferential surface.

Accordingly, the width of the holder frame as viewed in the axial direction is the dimension which is obtained by adding the small bending allowance to the plate thickness of the metal plate which is the basic material. The thickness of the mounting leg is included in the above-described dimension in a general shape in which the mounting leg is not bent in the plate thickness direction.

Thus, the dimension from the inner circumferential surface to the bottom surface of the mounting leg may be kept at minimum a and may be the dimension which is somewhat larger than the thickness of the material. Accordingly, the fishing line is close to the fishing rod, so that it is possible to enhance the casting controllability of the fishing rod.

Incidentally, the shapes of the respective components and parts in the foregoing embodiments, for example, the bending amount and the bending angle of the holder frame, the relationship between the diameter of the guide ring and the plate thickness of the frame and the like are exemplified and may apparently be modified and determined in response to the mounting position of the line guide ring on the fishing rod and the function.

Also, it is apparent that the specific shape of the mounting leg may be freely selected in any one according to the present invention. Namely, although, in the foregoing embodiments, the mounting leg is not bent in a direction perpendicular to the plate. Needless to say, it is possible to obtain the same effect even in the case where the mounting leg is bent in that direction as that obtained by the embodiments in which the holder frame is bent specifically.

In the specification and claims, "a (single) mounting leg" means that the number of the overall shape is one, including, for example, an intermediate cut V-shaped one or the like.

Various details of the invention may be changed without departing from its spirit or its scope. Furthermore, the foregoing description of the embodiments according to the present invention is provided for the purpose of illustration only, and not for the purpose of limiting the invention as defined by the appended claims and their equivalents.

What we claim is:

1. A line guide ring for a fishing rod comprising an integral, unitary annular holder frame and mounting leg formed from a metal plate, said annular holder frame having a front and a rear and an inner circumferential surface and being bent from said inner circumferential surface in a rearward direction to thereby form a shallow inner circumferential stepped portion coaxial with said inner circumferential surface, said annular holder frame having an annular surface facing rearwardly, said mounting leg extending rearwardly from said rearwardly facing surface at a lower portion thereof, and said mounting leg having a bottom surface, wherein the holder frame has a width h extending from said inner circumferential surface to the bottom surface of the mounting leg, and the width h of the holder frame is less than twice the maximum thickness t of the metal plate.

2. A line guide ring as defined in claim 1, further comprising a guide ring internally fitted into said annular holder frame.

3. A line guide ring as defined in claim 1, wherein said metal plate comprises a member of the group consisting of stainless steel and aluminum.

4. A line guide ring as defined in claim 1, wherein said annular holder frame is bent in a rearward substantially axial direction.

5. A line guide ring as defined in claim 1, wherein said annular holder frame has an axis and is bent rearwardly at an angle from the axis thereof.

6. A line guide ring as defined in claim 5, wherein said angle is about 15°.

7. A line guide ring as defined in claim 1, wherein the width h of the holder frame is equal to the thickness t of the metal plate plus an allowance s caused by the bending of the holder frame.

8. A line guide ring as defined in claim 1, wherein said holder frame is bent from said inner circumferential surface in a direction including a component in an axial direction to thereby form said shallow inner circumferential inner stepped portion.

9. A line guide ring as defined in claim 1, wherein said rearwardly facing surface of said holder frame is in an essentially radial direction.

10. A line guide ring as defined in claim 9, wherein said annular holder frame has an axis and said rearwardly facing surface of said holder frame is disposed at an angle from said axis.

11. A line guide ring as defined in claim 10, wherein said angle is about 15°.

* * * * *